F. HODGKINSON.
LONGITUDINAL ADJUSTING MEANS FOR TURBINE ROTORS.
APPLICATION FILED APR. 11, 1905.
1,015,315.
Patented Jan. 23, 1912.
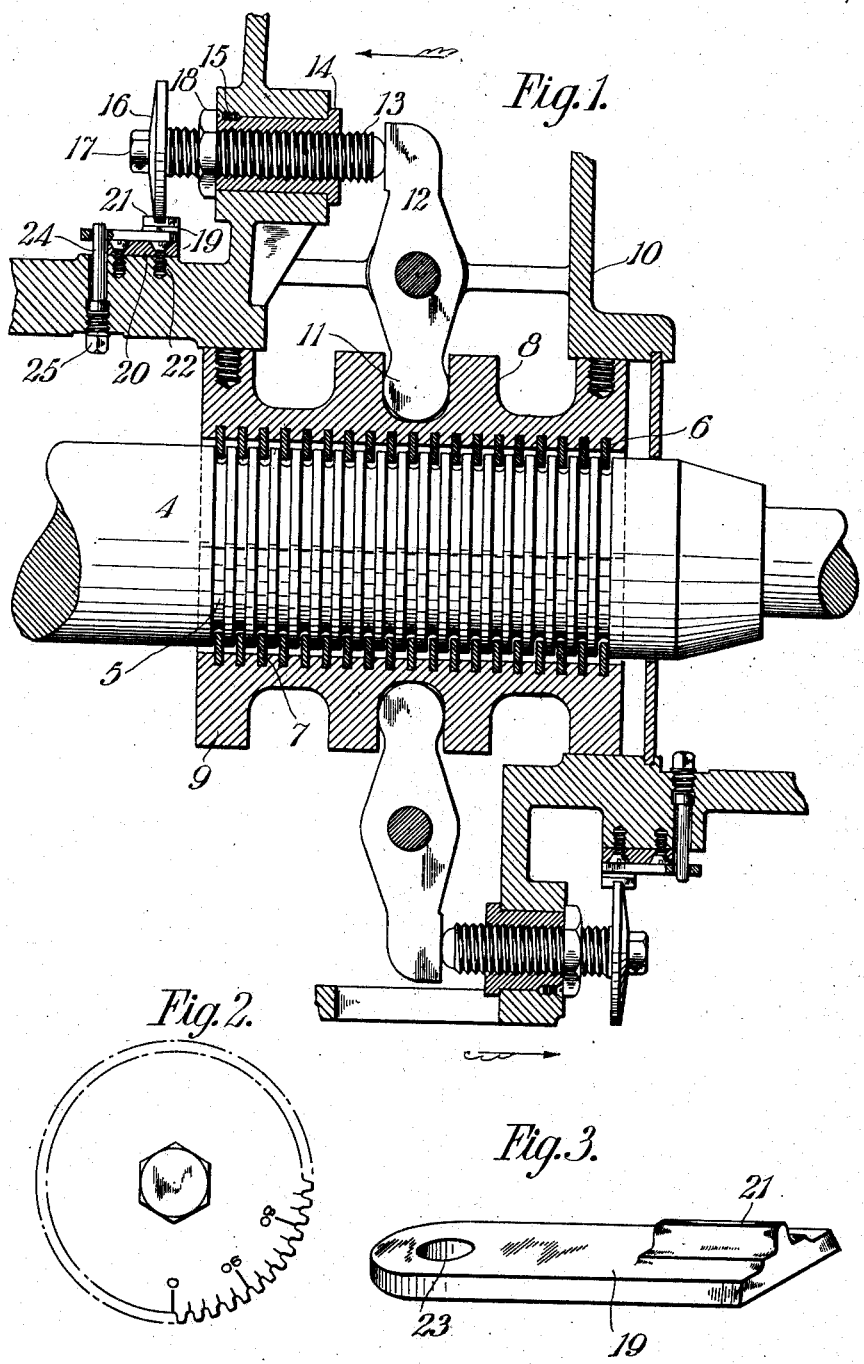

UNITED STATES PATENT OFFICE.

FRANCIS HODGKINSON, OF EDGEWOOD PARK, PENNSYLVANIA, ASSIGNOR, BY MESNE ASSIGNMENTS, TO THE COLONIAL TRUST COMPANY, TRUSTEE, OF PITTSBURGH, PENNSYLVANIA, A CORPORATION OF PENNSYLVANIA.

LONGITUDINAL ADJUSTING MEANS FOR TURBINE-ROTORS.

1,015,315.  Specification of Letters Patent.  Patented Jan. 23, 1912.

Application filed April 11, 1905. Serial No. 255,034.

*To all whom it may concern:*

Be it known that I, FRANCIS HODGKINSON, a subject of the King of Great Britain and Ireland, residing at Edgewood Park, in the county of Allegheny and State of Pennsylvania, have invented a new and useful Improvement in Longitudinal Adjusting Means for Turbine-Rotors, of which the following is a specification.

This invention relates to elastic fluid turbines, and more particularly to means whereby the rotors thereof are adjusted relatively to the stator elements, or more particularly to means for alining elastic fluid turbine rotors and locking the same in the proper position.

An object of this invention is to produce a simple and efficient device for adjusting or alining turbine rotors, and by means of which, when once properly adjusted, the rotors may be locked in an adjusted position.

A further object of this invention is to produce simple means whereby any rotating shaft or element, which it is desirable to adjust longitudinally and to lock in adjusted position, may be so adjusted and locked against tampering, in the most efficient manner.

These and other objects which will readily appear to those skilled in the art to which this invention pertains, I accomplish by means of the device illustrated in the accompanying drawings throughout the several views of which like elements are denoted by like characters.

In the drawings, Figure 1 is a view of this device applied to a rotatable shaft, a portion of the device being in section and a portion in side elevation: Fig. 2 is a face view of one of the elements embodied in the make-up of the device, and Fig. 3 is a view in perspective of one of said elements.

A rotatable shaft 4, which may be the shaft of an elastic fluid turbine, a pump, a fan or compressor, or, in fact, the rotatable shaft or element of any one of a great variety of devices, is provided with a series of annular depressions or channels 5. Surrounding the shaft, and provided with semi-annular collars 6 and 7, which lie between the depressions 5, are two blocks or members 8 and 9, which are movable longitudinally of the shaft. These two blocks or members, which, taken together, completely surround the shaft, are preferably separated one from the other on a horizontal plane coinciding with the horizontal plane taken through the axis of said shaft. It will be understood that this device is not only applicable to horizontally disposed shafts, but may be utilized with either horizontal or vertical shafts, or with shafts inclined at any desired angle, and, of course, when the shaft is not horizontally disposed, the plane of separation of the blocks 8 and 9 will include the shaft axis, as above described.

Pivotally mounted in the turbine or other machine casing 10, above block 8, and provided with a ball-shaped end 11, which lies within a socket formed for that purpose in block 8, is a lever 12. This lever, which is utilized for moving the shaft in the direction of the arrow shown thereabove, is moved in a direction opposite to the direction indicated by said arrow by means of a screw 13 threaded through a bushing 14 extending through a portion of the casing 10, and which is preferably locked to said casing by means of a screw 15. The inner end of screw 13 abuts against the upper arm of lever 12, and the outer end of the screw is provided with an enlarged disk-shaped member 16, the periphery of which is cut in the nature of a gear, while its face is preferably scaled and numbered, as illustrated in Fig. 2. Exterior to the disk portion, the screw is formed, as at 17, for the reception of a suitable wrench, and a locking nut 18 is provided for primarily locking the screw in its adjusted positions.

Serving as a pointer for the scale to disk 16, and as a lock, supplemental to locking nut 18, a sliding member 19 is utilized, and said member 19, which is slidable in a dovetailed or undercut way formed in a block 20, is provided with a tooth portion 21 adapted when said member is in normal position to lie between two of the teeth in the periphery of the disk member. Block 20, having the slide-way for member 19, is preferably secured to the casing 10 by means of screws 22, which lie below the member 19 when the same is in normal position. Member 19 is provided with a hole 23, and one end of a headed pin 24, extending up through an opening in the casing 10, is adapted to lie within said hole to lock member 19 against movement. Pin 24 is held in position by means of a screw plug 25 threaded into the inner side of casing 10.

Since the mechanism for adjusting and locking the block 9 is identical with the mechanism above described, it is believed that no description of the same is necessary. It will be understood, however, that block 9 is utilized for moving the shaft 4 in the direction indicated by the lower arrow in Fig. 1.

It will be understood that if it is desired to adjust the shaft in the direction indicated by the upper arrow, it will be necessary to unlock the lower mechanism and allow the block 9 to move freely to a position in which the collars 7 will be only in slight contact with the walls of channels 5, and if it is desired to adjust the shaft in the opposite direction the lower device will be utilized for moving the same and the upper one slacked up.

Since the screw plugs 25 are located within the turbine or other machine casing, it will be seen that in order to change the device, or change the adjustment of shaft 4, it will be necessary to gain access to the interior of the casing, and, as this cannot be done while the machine is in operation, it will be seen that during the operation of the machine the alinement of its rotor cannot be tampered with, and in elastic fluid turbines wherein the clearance between the stator and rotor elements is more or less fine, this check against tampering is important.

It will be understood that if shaft 4 is subjected to any unbalanced end thrust, this device may be utilized as an end thrust bearing.

In accordance with the provisions of the patent statutes I have described the principle of operation of my invention, together with the apparatus which I now consider to represent the best embodiment thereof; but I desire to have it understood that the apparatus shown is only illustrative and that the invention can be carried out by other means.

Having thus described this invention, what I claim as new and useful and desire to secure by Letters Patent is:—

1. In combination with a shaft capable of longitudinal adjustment, a casing surrounding said shaft, adjustment blocks extending circumferentially around and movable longitudinally of said shaft, levers mounted on said casing and contacting with said blocks and means operating between said casing and said levers for varying the positions of said blocks to adjust said shaft.

2. In combination with a shaft capable of longitudinal adjustment, adjustment blocks extending circumferentially around said shaft and movable longitudinally of said shaft, a casing surrounding said blocks and means located between said casing and said blocks for moving one block in one direction and the other in the other direction to adjust the longitudinal position of said shaft.

3. In combination with a rotatable shaft capable of longitudinal adjustment, two semi-cylindrical adjustment blocks extending circumferentially around said shaft and movable longitudinally of the shaft and means for moving one block in one direction and the other block in the other direction to thereby adjust the longitudinal position of said shaft.

4. In combination with a shaft capable of longitudinal adjustment and having a plurality of circumferentially-extending slots, two adjustment blocks extending circumferentially around said shaft and movable longitudinally of said shaft, projections on said blocks and coöperating with said slots, a casing surrounding the shaft and independent means operating between each block and said casing for moving one block in one direction and the other block in the other direction to thereby adjust the longitudinal position of the shaft.

5. In combination with a rotatable shaft capable of longitudinal adjustment and having a plurality of circumferentially-extending slots, two semi-cylindrical adjustment blocks surrounding said shaft and movable longitudinally thereof, semi-annular projections on said blocks and coöperating with the slots of said shaft, a casing surrounding said shaft and independent means operating between each block and said casing for moving one block in the one direction and the other block in the other direction to thereby adjust the longitudinal position of said shaft.

6. In combination with a rotatable shaft capable of longitudinal adjustment, a casing surrounding said shaft, two adjustment blocks located within said casing and surrounding said shaft and movable longitudinally thereof, a lever between said casing and each block and agents coöperating with said levers to move said blocks in opposite directions to thereby adjust the longitudinal position of said shaft.

7. In combination with a shaft capable of longitudinal adjustment, adjustment blocks extending circumferentially around said shaft, a lever for moving each block longitudinally of the shaft, a casing surrounding the shaft and adjusting screws operating between said casing and said levers and means for locking said levers in place and visibly indicating the positions of said blocks.

8. In combination with a shaft capable of longitudinal adjustment, adjustment blocks extending circumferentially around said shaft and movable longitudinally thereof, a casing surrounding said shaft, means operating between said casing and each block for moving said blocks longitudinally of said shaft to adjust its longitudinal position and means for locking said blocks in place and visibly indicating their position.

In testimony whereof I have hereunto subscribed my name this 10th day of March, 1905.

FRANCIS HODGKINSON.

Witnesses:
 DAVID WILLIAMS,
 JNO. S. GREEN.

Copies of this patent may be obtained for five cents each, by addressing the "Commissioner of Patents, Washington, D. C."